Feb. 2, 1943.  R. CRZELLITZER  2,309,754
SELF-CENTERING CHUCK
Filed March 16, 1940
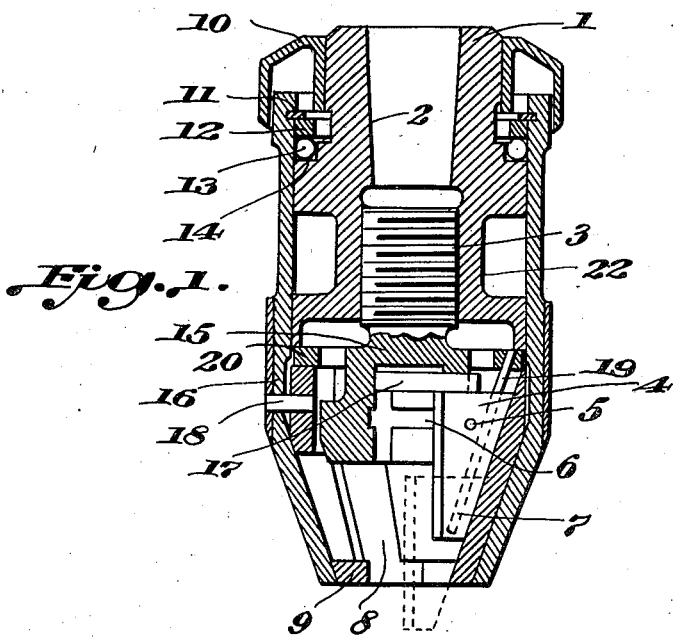
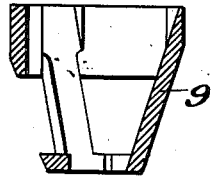
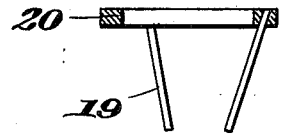
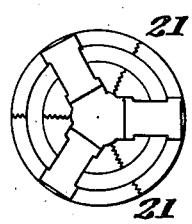
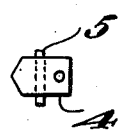
Inventor,
R. CRZELLITZER
By Young, Emery & Thompson
attys.

Patented Feb. 2, 1943

2,309,754

UNITED STATES PATENT OFFICE 2,309,754

SELF-CENTERING CHUCK

Robert Crzellitzer, Vilvorde, Belgium; vested in the Alien Property Custodian

Application March 16, 1940, Serial No. 324,413
In Italy April 22, 1939

2 Claims. (Cl. 279—60)

The present invention relates to a self-centering chuck having new and important features.

Said chuck is hereinafter described as embodied in a self-locking chuck but the arrangement on which the invention is based is applicable to any other type of self centering chuck or mandrel.

All self-centering chucks heretofore known have one or more of the following drawbacks: the locking sleeve is inefficiently guided against radial clamping force by an intermediate guide bush on the body of the chuck; dust, cuttings, or other deleterious material can enter between the guide bush and the chuck body. Furthermore, between the jaws and the locking sleeve there are only line contacts, and therefore, besides having very high specific pressures and consequent wear the entry of cuttings or the like between the jaws and sleeve becomes possible, leading to flattening of the jaws and decentering of the chuck. Moreover, it is extremely difficult to manufacture the usual complicated jaws with the desirable high degree of accuracy.

All these drawbacks have been eliminated by the arrangement according to the present invention, the main characteristic of which is that the jaws have a plane surface of large dimensions which rests and slides on a corresponding surface on the guide member so that a great reduction of specific pressures between the jaws and the relative guide plane is achieved.

The accompanying drawing illustrates a practical embodiment as applied to the case of a self-centering and self-locking chuck.

In the drawing:

Fig. 1 is a vertical cross section of the complete chuck.

Fig. 2 is a vertical cross section of the cage.

Fig. 3 is a plan view of the part shown in Fig. 2.

Fig. 4 is a view in elevation of the jaw guide device.

Figs. 5 and 6 are elevation and plan views respectively showing a jaw.

The chuck body 1 has a conical cavity 2 serving for fixing the chuck on the spindle of a machine. It is also provided with an internal axial left-handed screw thread 3, in which is screwed the threaded stem of the jaw bearing member 15. In the lower part of the latter, which is of greater diameter, are cut three grooves, having a cross-like cross section and arranged at 120° from one another, wherein the jaws 4 are movably located, said jaws being mounted in the jaw bearing member 15, but prevented from axial movement relatively thereto by pins 5 guided by the transverse furrow of the grooves.

In the axial direction the jaws 4 abut the jaw supporting member 15 through a plate 17.

The outer shell of the chuck which is operated to close the jaws, consists of a sleeve 16 the lower end of which is conical and the main portion cylindrical, the upper end being closed by ring 10. The axial thrust on the sleeve 16 whilst locking the chuck, is transmitted to an abutment 14 on the body 1 through a thrust bearing comprising a set of balls 13, a pressure ring 12 and an elastic ring 11 which, engaging in an appropriate groove in sleeve 16 is adapted to sustain said thrust. The sleeve 16 rotatable on the body 1 is efficiently guided thereon.

The end ring 10 is pressed on the body 1 and is therefore rigidly connected thereto and it prevents any dust, cuttings or other deleterious material entering the chuck. The support surfaces of the jaws 4 are plane and engage with precision with inside plane surfaces, machined on the arms 8 of a cage 9 positioned between the jaws and the conical portion of the sleeve, said arms 8 entering the radial grooves of the jaw supporting part 15 when the latter is being unscrewed. In order to avoid any difficulty in tooling the plane inside surfaces of the arms of the cage 9 (which, to ensure a satisfactory centering of the chuck, must be most accurately machined) the cage 9 may be divided into a number of sections equal to the number of jaws of the chuck, by fabricating the same from a single piece and subsequently dividing it, preferably after external machining is completed, approximately along lines 21 (Fig. 3).

In assembling the chuck, these pieces are introduced into the sleeve 16 and, as they engage with the conical portion thereof, any displacement of the pieces with respect to one another is prevented. One or more pins 18 serve to fasten each piece of the cage on the sleeve 16. To effect parting of the cage approximately along lines 21, the piece is weakened on the required rupture lines by incisions. To prevent deformation of the cage when broken, the same is made of a brittle material, such as steel tempered before rupture or even cast iron. The possibility of making the jaw supporting member of cast iron is a consequence of the contact on a large surface between jaws and cage, instead of the contact along a line as in almost all the constructions heretofore known. The result is a very much lower specific pressure, and ideal working conditions between tempered jaws and cast iron guides such as have been never attained heretofore and which, after a certain period of use of the chuck, have the effect of polishing the cast iron surface of contact, without wearing the tempered jaws.

In the embodiment described, while opening the chuck, the jaws are forced to open radially outwardly by a simple structure comprising steel rods 19 fixed on a ring 20 concentric with the sleeve 16 and freely rotatable therewith, and adapted to locate itself in a clearance space between the body 1 and the jaw supporting cage. The rods are fixed on the ring at an inclination resulting in parallelism with the sliding plane of the relative jaws which slide on said rods, the jaws being provided with a bore 7 parallel to their support surface.

As the jaws are held axially by means of the rods 5 slidable in the grooves 6 of the jaw supporting member 15, the guiding of the jaws is as a result completely positive, and any chance of rupture by fatigue which normally occurs after a certain period of use in chucks having jaws operated by expansion, or compression, or flexion springs, is eliminated. The form of the jaws themselves is so simple, that it becomes quite possible to construct them entirely of tempered steel of the greatest hardness obtainable; it is also very easy to grind the same thoroughly.

In Fig. 1 the chuck is shown with the jaws completely open. After having introduced the drill or other tool, locking is obtained by keeping the body 1 stationary by means of the ring 10 and turning the sleeve 16 in the right hand direction. The movement of rotation is transmitted from the sleeve 16, through the cage 9 and jaws 4, to the jaw supporting member 15, the threaded portion of which on unscrewing is displaced downwardly and acts through the plate 17 on the jaws. These are as a consequence also displaced downwardly and simultaneously, due to the inclination of the guide arms 8, toward the centre, thus clamping the tool.

It will be clearly seen that, when the jaws are completely open and, therefore, the drills are of maximum diameter, all the turns of the thread 3 of the jaw supporting member are engaged.

During working the resistance met by the tool causes a closer clamping by the jaws and, therefore, emphasizes the self-centering effect of the chuck.

The embodiment described is given only by way of example and can be modified without extending beyond the limits of the invention, the main characteristic of which lies in the fact that the jaws have an ample plane surface resting on a corresponding plane surface of the guide member, and that the special constructional arrangement allows easy fabrication of said guide surfaces.

What I claim is:

1. A self-centering chuck comprising a chuck body, a clamping sleeve rotatable thereon, a plurality of chuck jaws with outer bearing faces, a cage inside said sleeve, said cage having inclined internal bearing surfaces for the bearing faces of the jaws, said bearing surfaces taking the radial clamping effort of the chuck, means operated by rotation of said sleeve for axially moving the jaws, a ring adjacent, concentric and rotatable with the cage, and wire rods on said ring inclined toward the center of the chuck at the same angle of inclination as that of the said faces of the jaws, said rods engaging bores in the jaws extending parallel to their outer bearing faces.

2. A chuck as claimed in claim 1 in which the jaws are guided radially in the jaw operating means by means of transverse pins engaging radial grooves in the said means.

ROBERT CRZELLITZER.